(12) United States Patent
Kawachi et al.

(10) Patent No.: US 11,146,064 B2
(45) Date of Patent: Oct. 12, 2021

(54) POWER SUPPLY SYSTEM AND CONTROL DEVICE

(71) Applicants: Kabushiki Kaisha Toshiba, Minato-ku (JP); Toshiba Energy Systems & Solutions Corporation, Kawasaki (JP)

(72) Inventors: Shunsuke Kawachi, Tama (JP); Mami Mizutani, Hachioji (JP); Tsutomu Tanno, Fuchu (JP); Tatsuya Hashimoto, Kawasaki (JP); Yasuhiro Ogura, Yokohama (JP); Ken Yabui, Setagaya (JP)

(73) Assignees: Kabushiki Kaisha Toshiba, Minato-ku (JP); Toshiba Energy Systems & Solutions Corporation, Kawasaki (JP)

(*) Notice: Subject to any disclaimer, the term of this patent is extended or adjusted under 35 U.S.C. 154(b) by 0 days.

(21) Appl. No.: 16/702,816

(22) Filed: Dec. 4, 2019

(65) Prior Publication Data

US 2020/0106268 A1    Apr. 2, 2020

Related U.S. Application Data

(63) Continuation of application No. PCT/JP2018/020493, filed on May 29, 2018.

(30) Foreign Application Priority Data

Jun. 7, 2017    (JP) .............................. JP2017-112849

(51) Int. Cl.
*H02J 3/38* (2006.01)
*H02M 5/458* (2006.01)
(Continued)

(52) U.S. Cl.
CPC ................. *H02J 3/01* (2013.01); *H02M 7/44* (2013.01)

(58) Field of Classification Search
CPC .. H02M 7/493; H02M 7/44; H02J 3/01; H02J 3/32; H02J 3/38; Y02E 40/40
See application file for complete search history.

(56) References Cited

U.S. PATENT DOCUMENTS

| 7,482,710 B2 * | 1/2009 | Ichinose | ................... H02J 9/08 307/67 |
| 2015/0280579 A1 * | 10/2015 | Ishigaki | .................. B60L 58/21 307/77 |

(Continued)

FOREIGN PATENT DOCUMENTS

| CN | 105811456 A | 7/2016 |
| EP | 3 012 951 A1 | 4/2016 |

(Continued)

*Primary Examiner* — Carlos Amaya
*Assistant Examiner* — Esayas G Yeshaw
(74) *Attorney, Agent, or Firm* — Oblon, McClelland, Maier & Neustadt, L.L.P.

(57) ABSTRACT

A power supply system includes a plurality of power conversion devices, a plurality of breakers, and a controller. The plurality of breakers are respectively connected to the plurality of power conversion devices and configured to perform switching of an electrical connection between the power conversion device and a power system, wherein the breaker switches an ON state and an OFF state. The controller is configured to control the breakers and switch connection states of the plurality of power conversion devices are switched, and the controller being configured to determine whether or not the connected breaker is in an ON state and electrically conducted to the power system and the number of the power conversion devices in a standby state reaches a predetermined number.

14 Claims, 15 Drawing Sheets

(51) Int. Cl.
*H02J 3/01* (2006.01)
*H02M 7/44* (2006.01)

(56) References Cited

U.S. PATENT DOCUMENTS

| | | |
|---|---|---|
| 2016/0028301 A1 | 1/2016 | Murakami et al. |
| 2017/0179727 A1* | 6/2017 | Valderrey Sanchez ...................... H02J 3/386 |
| 2017/0237128 A1* | 8/2017 | Kubo .................... H02J 7/0025 429/7 |

FOREIGN PATENT DOCUMENTS

| | | |
|---|---|---|
| JP | 05-176459 A | 7/1993 |
| JP | 2001-298865 A | 10/2001 |
| JP | 2002-017091 A | 1/2002 |
| JP | 2005-024469 A | 1/2005 |
| JP | 2007-288842 A | 11/2007 |
| JP | 2011-193685 A | 9/2011 |
| WO | WO 2014/125649 A1 | 8/2014 |
| WO | WO 2014/175214 A1 | 10/2014 |
| WO | WO 2014/203394 A1 | 12/2014 |

* cited by examiner

| COMMAND VALUE | POWER SUPPLY DEVICE: NO. | 1 | 2 | 3 | ... | ... | ... | ... | n | TOTAL |
|---|---|---|---|---|---|---|---|---|---|---|
| 1 | BREAKER | on | off | off | ... | ... | ... | ... | off | |
|   | POWER CONVERSION DEVICE | STANDBY | off | off | ... | ... | ... | ... | off | 1 |
| 2 | BREAKER | on | on | off | ... | ... | ... | ... | off | |
|   | POWER CONVERSION DEVICE | STANDBY | STANDBY | off | ... | ... | ... | ... | off | 2 |
| a−1 | BREAKER | on | on | on | ... | a−1 on | ... | ... | off | |
|   | POWER CONVERSION DEVICE | STANDBY | STANDBY | STANDBY | ... | STANDBY | ... | ... | off | a |
| b+1 | BREAKER | on | on | on | ... | a−1 on | b+1 on | ... | off | |
|   | POWER CONVERSION DEVICE | STANDBY | STANDBY | STANDBY | ... | STANDBY | STANDBY | ... | off | b+1 |
| n | BREAKER | on | on | on | ... | a−1 on | b+1 on | ... | on | |
|   | POWER CONVERSION DEVICE | STANDBY | STANDBY | STANDBY | ... | STANDBY | STANDBY | ... | STANDBY | n |

POWER SUPPLY SYSTEM AND CONTROL DEVICE

TECHNICAL FIELD

Embodiments of the present invention relate to a power supply system and a control device.

BACKGROUND ART

In the related art, a power supply system in which a plurality of power conversion devices respectively connected to a plurality of power supply devices are connected in parallel to a power system is known. In a power supply system including a plurality of power conversion devices, when the number of the power conversion devices in a standby state reaches a predetermined number, harmonic components flowing from the power system side may resonate with the predetermined number of power conversion devices that are in the standby state, and a problem may occur due to the harmonic components amplified due to the resonance.

CITATION LIST

Patent Literature

[Patent Literature 1]
Japanese Unexamined Patent Application, First Publication No. 2002-17091

SUMMARY OF INVENTION

Technical Problem

An object of the present invention is to provide a power supply system and a control device capable of suppressing an occurrence of resonance due to harmonics from a power system.

Solution to Problem

A power supply system of an embodiment includes a plurality of power conversion devices, a plurality of breakers, and a controller. The plurality of breakers are respectively connected to the plurality of power conversion devices and configured to perform switching of an electrical connection between the power conversion device and a power system, wherein the breaker switches an ON state and an OFF state. The controller is configured to control the breakers and switch connection states of the plurality of power conversion devices are switched, and the controller being configured to determine whether or not the connected breaker is in an ON state and electrically conducted to the power system and the number of the power conversion devices in a standby state reaches a predetermined number.

BRIEF DESCRIPTION OF DRAWINGS

FIG. 5 is a diagram illustrating an example of a table 100 referred to in order to change the number of the power conversion devices 14 that are in the standby state in the embodiment.

DESCRIPTION OF EMBODIMENTS

Hereinafter, a power supply system and a control device of the embodiment will be described with reference to the drawings. The power supply system is, for example, a large-scale power supply system such as a large-scale storage battery system, a large-scale photovoltaic power generation system, and a large-scale wind power generation system having an output of tens of [MW]. The power supply system 10 includes a plurality of power conversion devices (PCS: Power Conditioning Subsystem) of hundreds of [kW] to several [MW] connected in parallel, in order to connect a large number of storage batteries or power generation devices to a system.

In the following description, it is assumed that a power storage system is applied to a large-scale storage battery system. However, storage batteries can be replaced with a photovoltaic power generation device (PV) or a wind power generation device, and the power storage system can be applied to a large-scale photovoltaic power generation system or a large-scale wind power generation system.

First Embodiment

Figure 1:
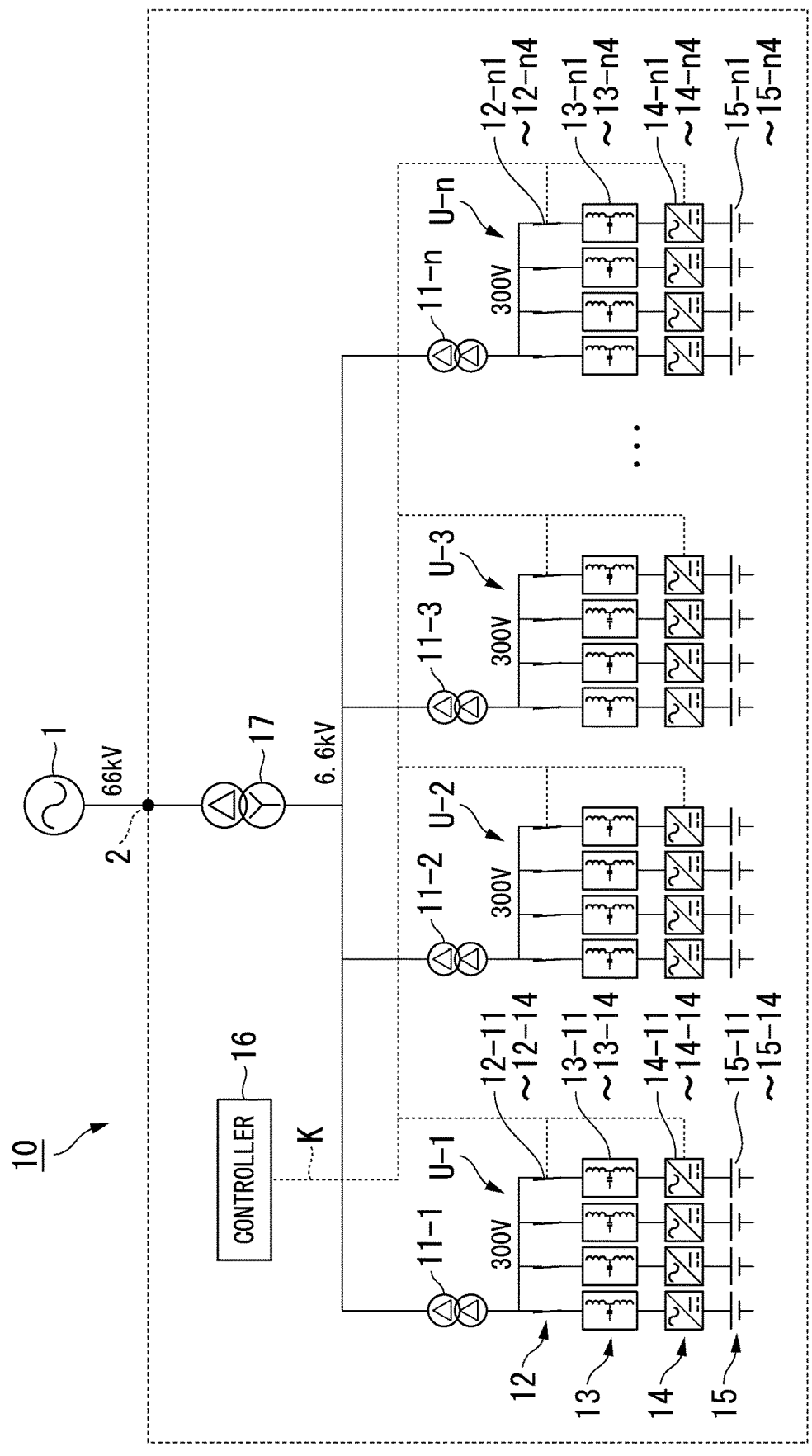
FIG. 1 is a diagram illustrating an example of a configuration of a power system 1 of an embodiment.

FIG. 1 is a diagram illustrating an example of a configuration of a power supply system 10. The power supply system 10 includes, for example, a plurality of power supply devices U-1 to Un (n: natural number), a controller 16, and an interconnection transformer 17. The power supply system 10 is connected to a power system 1 via a system connection terminal 2. The power system 1 and the power supply system 10 transmit, for example, a three-phase alternating current with a fundamental frequency of 50 to 60 [Hz]. In FIG. 1, three phases in the power system 1 and the power supply system 10 are virtually indicated by one line. The plurality of power supply devices U-1 to Un supply power to the power system 1.

The plurality of power supply devices U-1 to Un are integrated, for example, before the interconnection transformer 17 and connected in parallel to the power system 1 via the interconnection transformer 17. Since the plurality of power supply devices U-1 to Un have the same configuration, the power supply device Un will be described below as a representative. The power supply unit U-n includes a boosting transformer 11-n, four breakers 12-n1 to 12-n4, four PCS filters 13-n1 to 13-n4, and four power conversion devices 1414-n1 to 14-n4, and four storage batteries 15-n1 to 15-n4.

The boosting transformer 11-n is provided closest to the power system 1 in the power supply unit U-n. The breaker 12-n1, the PCS filter 13-n1, and the power conversion device 14-n1, and the storage battery 15-n1 are connected in series in order from the side closest to the boosting transformer 11-n. A breaker 12-nk, a PCS filter 13-nk, a power conversion device 14-nk, and a storage battery 15-nk are serially connected in parallel to the boosting transformer 11n (k=2 to q; q=4 in FIG. 1).

Hereinafter, when the power supply devices U-1 to Un are not distinguished from each other, the power supply devices U-1 to Un are simply referred to as a power supply device U. When respective components of the power supply device U are not distinguished from each other, the components are referred to as the boosting transformer 11, the breaker 12, the PCS filter 13, the power conversion device 14, and the storage battery 15.

The boosting transformer 11 boosts a voltage (300 [V]) output by the power conversion device 14 to, for example, 6.6 [kV] and outputs the boosted voltage to the power system 1. While the output voltage is increased by boosting in the boosting transformer 11, an output current value is decreased so that necessary power is secured, and a width of an electric wire connected to the interconnection transformer 17 is small.

The breaker 12 is, for example, a semiconductor breaker. The breaker 12 is controlled by a controller 16 to be described below, and switches an electrical connection between the power conversion device 14 and the power system 1 through switching between ON and OFF states. When the breaker 12 is in the ON state, the power conversion device 14 is electrically conducted to the power system 1.

Figure 2:
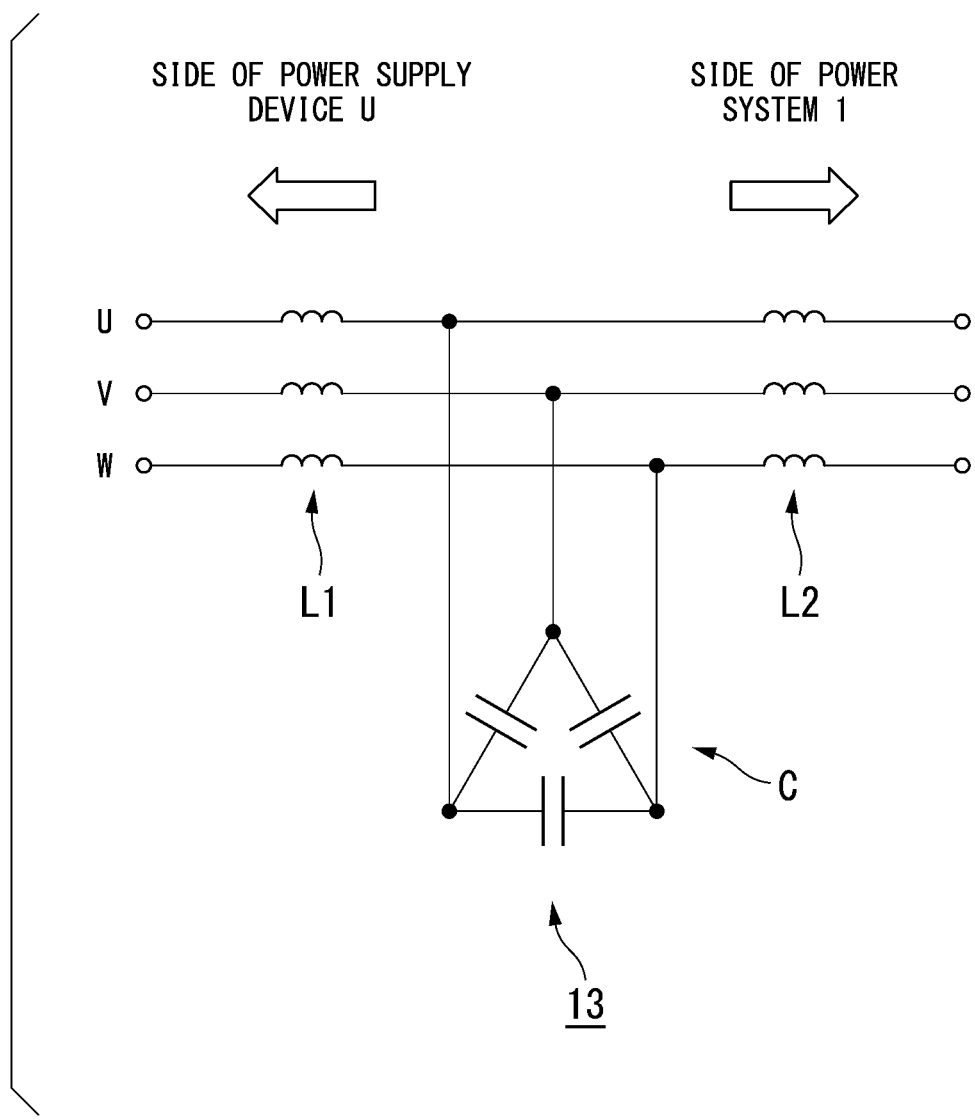
FIG. 2 is a diagram illustrating an example of an equivalent circuit diagram of a PCS filter 13 of the embodiment.

The PCS filter 13 is a passive filter circuit for absorbing noise of harmonic components of the power conversion device 14 itself, which has been generated due to switching of the power conversion device 14. FIG. 2 is an equivalent circuit diagram of the PCS filter 13. The PCS filter 13 is, for example, a T-type filter circuit of L-C-L including reactors L1 and L2 and a capacitor C connected in series to UVW phases. A form of the filter circuit is not limited to a T-type circuit.

Referring back to FIG. 1, the power conversion device 14 converts a DC power output from the storage battery 15 into AC power and outputs the AC power to the power system 1 side. A voltage at an AC terminal of the power conversion device 14 is, for example, 300 [V]. The power conversion device 14 is controlled by the controller 16 to be described below. The storage battery 15 is a rechargeable secondary battery, for example.

The controller 16 is realized by a processor such as a central processing unit (CPU) executing a program (software). The controller 16 to be described below may be realized by hardware such as a large scale integration (LS1), an application specific integrated circuit (ASIC), or a field-programmable gate array (FPGA) or may be realized by software and hardware in cooperation.

The controller 16 controls the entire power supply system 10 on the basis of, for example, an external command signal. The controller 16, for example, controls the power supply system 10 on the basis of a command signal transmitted according to power supply and demand. The controller 16, for example, controls the breaker 11 and the power conversion device 14. The controller 16 switches the connection state of the power conversion device 14 via a communication line K. The controller 16 outputs an operation command to the plurality of power conversion devices 14 via the communication line K.

The controller 16 transmits an ON signal to the breaker 11 to cause the breaker 11 to enter an ON state (an electrically connected state or closed state) so that the power conversion device 14 is connected to the power system 1 side. The controller 16 transmits an OFF signal to the breaker 11 to cause the breaker 11 to enter an OFF state (a disconnected state or open state) so that the power conversion device 14 is disconnected from the power system 1 side.

Thus, the controller 16 controls the breakers 12 such that turning ON/OFF the plurality of power conversion devices 14 and switching between a standby state and an operating state are controlled. The standby state is a state in which the power conversion device 14 does not perform power conversion in a state in which an output is 0 [kW] while the breaker 12 is in the ON state (an ON standby state). The operating state is a state in which the power conversion device 14 is controlled so that power is input or output and a charging or discharging operation is performed. The controller 16 controls an input or output value of the power conversion device 14 that is in the operating state.

The interconnection transformer 17 boosts the voltage (for example, 6.6 [kV]) output from the boosting transformer 11 to a higher voltage (for example, 66 [kV]) and outputs the boosted voltage to the power system 1. The above device configuration is an example, and is not limited to the above content such as the number of components.

Next, the harmonic resonance generated in the power supply system 10 will be described. In the control of the power supply system 10, it is assumed that the power conversion device 14 is in the ON standby state.

In the power supply system 10 including the plurality of power conversion devices 14, when a predetermined number of power conversion devices 14 are in the ON standby state in a state in which outputs of the power conversion devices 14 are 0 [kW], harmonic components flowing from the power system 1 side are likely to be amplified due to the resonance in the power conversion device 14 and a problem such as stopping of the power conversion device 14 is likely to be caused.

This phenomenon is caused by a resonant circuit being formed by impedance components of the transformers (the interconnection transformer 17 and the boosting transformer 11), cables, and the PCS filter 13 connected between the system connection terminal 2 of the power system 1 and an output terminal of the power conversion device 14 in the power supply system 10. It has been confirmed that this resonance occurs in a frequency region of 250 to 450 Hz corresponding to harmonics of a low order (about fifth order to ninth order) with respect to a fundamental frequency.

When the plurality of power conversion devices 14 are in the standby state, the power conversion device 14 side of the PCS filter 13 can be regarded as being in an OFF state, and the plurality of PCS filters 13 can be regarded as a series circuit including an inductance component and a capacitance component. Therefore, series resonance occurs due to the PCS filter 13.

In the power supply system 10 connected to the power system 1, since the voltage at the system connection terminal 2 connected to the power system 1 is higher than the voltage at the output terminal of the power conversion device 14, the transformers (the interconnection transformer 17 and the boosting transformer 11) are installed for boosting between the system connection terminal 2 and the power conversion device 14. Therefore, there is, for example, a leakage inductance of the transformer as a circuit element other than the PCS filter 13 in the power supply system 10. When there is the leakage inductance, impedance is increased at the resonance frequency.

In the power supply system 10, the power conversion devices 14 including the PCS filter 13 are connected in parallel. In the power supply system 10, when the number of PCS filters 13 connected in parallel increases, an inductance (L) in the PCS filter 13 decreases in inverse proportion to the number of PCS filters 13 connected in parallel, whereas a capacitance (C) increases in proportion to the number of PCS filters 13 connected in parallel. Here, a resonance frequency of the LC circuit is determined by $1/\{2\pi(LC)^{1/2}\}$.

In the power supply system 10, a range of an increase in the capacitance is greater than a range of a decrease in the inductance due to an increase in the number of the power conversion devices 14 connected in parallel, and a value of $1/\{2\pi(LC)^{1/2}\}$ decreases with an increase in number of power conversion devices 14 connected in parallel. In this case, a value of the resonance frequency of the power supply system 10 moves to the low frequency side.

When the resonance frequency of the power supply system 10 changes due to an increase in the number of the power conversion devices 14 connected in parallel, and the resonance frequency of the power supply system 10 moves into a region of about fifth to ninth harmonics with respect to a fundamental frequency, resonance is likely to be caused by harmonic components remaining on the power system 1 side, and the power conversion device 14 is likely to stop due to abnormality detection.

However, since the above description is based on the PCS filter 13 and the boosting transformer 11 connected to the power conversion device 14 having the same constants, the resonance frequency does not necessarily decrease with a change in the number of the power conversion devices 14 connected in parallel when there are PCS filters or boosting transformers of a plurality of types. However, in many cases, there is a risk that the resonance frequency will move and harmonic resonance will occur since the value of $1/\{2\pi(LC)^{1/2}\}$ of the power supply system 10 changes.

Next, a scheme for reducing occurrence of harmonic resonance in the power supply system 10 will be described.

Figure 3:
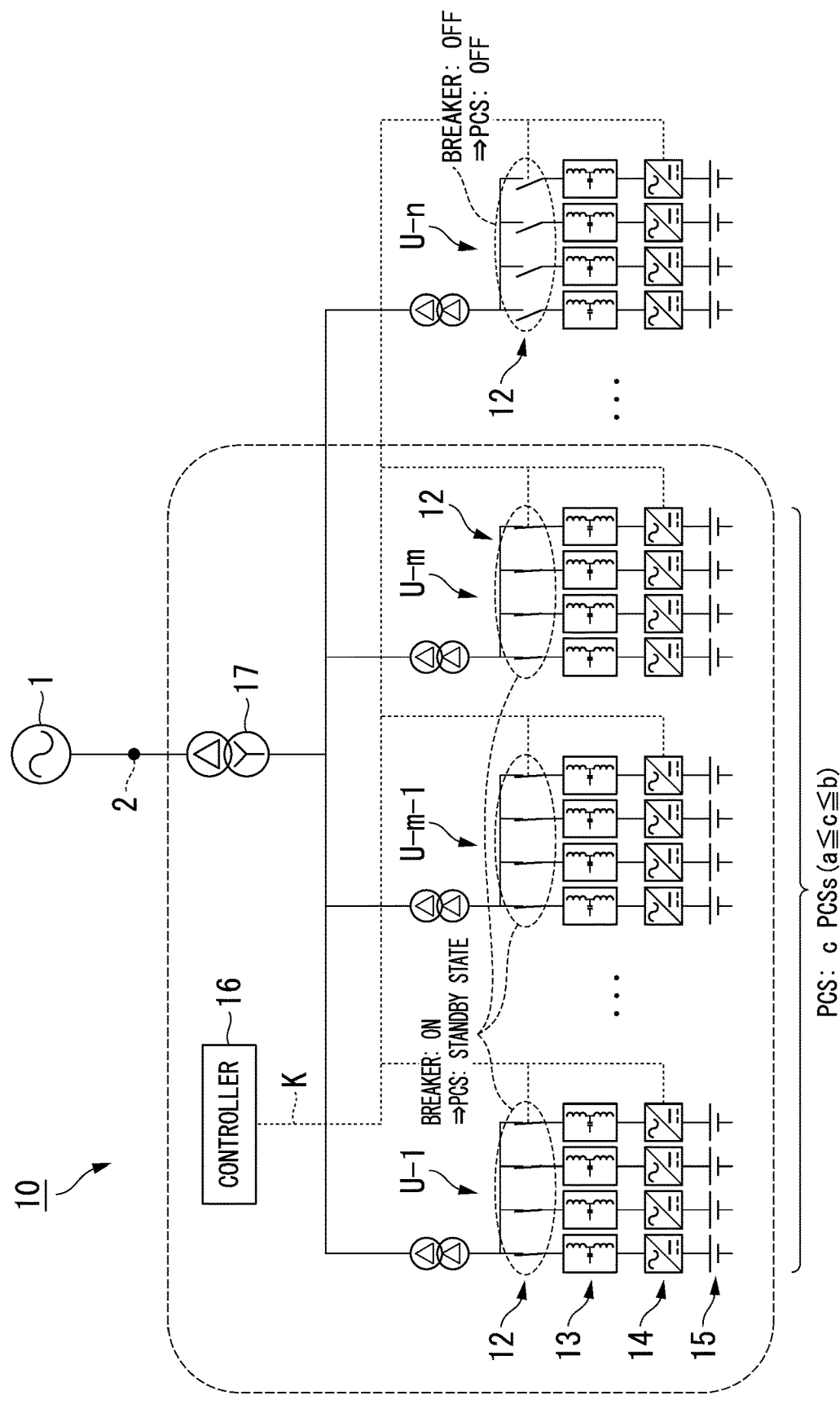
FIG. 3 is a diagram illustrating a state in which the number of the power conversion devices 14 in a standby state reaches a predetermined number in the embodiment.

FIG. 3 is a diagram illustrating a state in which the number of the power conversion devices 14 in the standby state reaches a predetermined number. It is assumed that a range of the predetermined number of power conversion devices 14 in which harmonic resonance occurs in the power supply system 10 is known in advance to be from a to b (a<b). In this case, when the number (=c) of power conversion devices 14 falls in a range of a≤c≤b, the harmonic resonance occurs in the power supply system 10.

As illustrated, in the power supply system 10 in this state, m power supply devices U-1 to Um are in a standby state. In this case, the respective breakers 12 of the power supply devices U-1 to U-m are in the ON state, and the 4m (=c) power conversion devices 14 are in the standby state. The breakers 12 of the other power supply devices U-m+1 to U-n are in an OFF state.

The controller 16 calculates the number of the power conversion devices 14 that are in the standby state and determines whether or not the number of the power conversion devices 14 that are in the standby state reaches the predetermined number, to reduce occurrence of the harmonic resonance in the power supply system 10.

Figure 4:
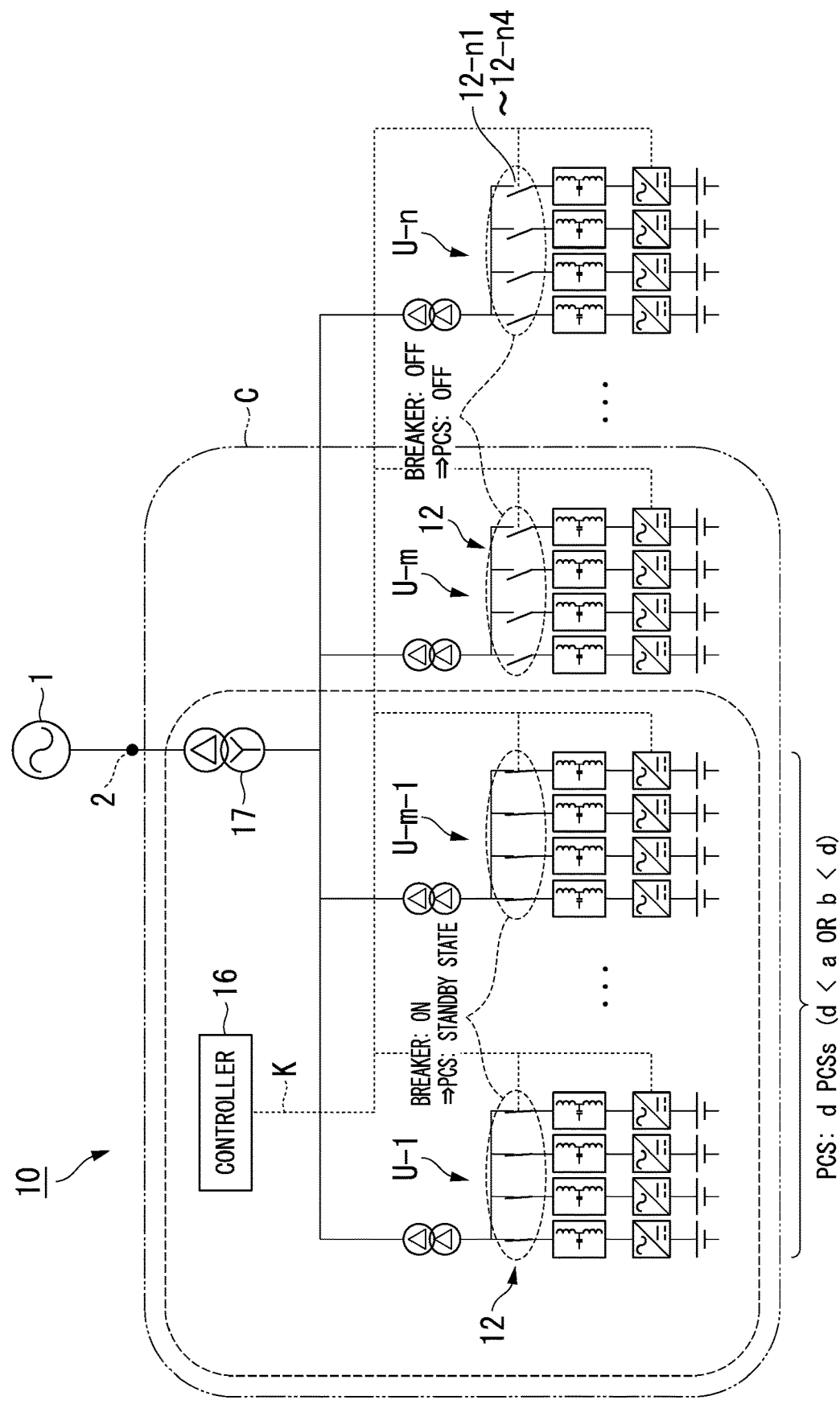
FIG. 4 is a diagram illustrating a state in which the number of the power conversion devices 14 in the standby state is changed in the embodiment.

FIG. 4 is a diagram illustrating a state in which the number of the power conversion devices 14 that are in the standby state is changed. When the number of the power conversion devices 14 that are in the standby state is changed, several control patterns can be considered. Hereinafter, the control patterns in the controller 16 will be described.

(1) When the controller 16 controls the number of the power conversion devices 14 that are in the standby state on the basis of an external command signal, the number may reach a predetermined number of power conversion devices 14 that are in the standby state in which harmonic resonance occurs. The controller 16 controls the number of the power conversion devices 14 that are in the standby state and calculates the number of the power conversion devices 14 that are in the standby state. When the controller 16 determines that the number of the power conversion devices 14 that are in the standby state reaches a predetermined number on the basis of a result of the calculation, the controller 16 controls the breakers 12 such that the number of the power conversion devices 14 that are in the standby state is changed.

(2) When the controller 16 sequentially changes the number of the power conversion devices 14 that are in the standby state on the basis of an external command signal, the number of power conversion device 14 that are in the standby state in a next control stage may reach the predetermined number in which harmonic resonance occurs. The controller 16 controls the number of the power conversion devices 14 that are in the standby state on the basis of an external command signal, and calculates the number of the power conversion devices 14 that are in the standby state in the next control stage.

When the controller 16 has determined that the number of the power conversion devices 14 that will be in the standby state in the next control stage reaches the predetermined number, the controller 16 controls the breakers 12 such that the number of the power conversion devices 14 in the standby state is changed so that the predetermined number of power conversion devices 14 are skipped. That is, the controller 16 changes the number of the power conversion devices 14 that are in the standby state before the number reaches the predetermined number.

(3) When the controller 16 increases (or decreases) an output from a certain output (including a zero state at the time of startup) to an output in a steady state, the controller 16 may change the number of the power conversion devices 14 by skipping a predetermined number according to a predetermined number increase schedule. In this case, the controller 16 may skip control of the breakers 12 for which the number of the power conversion devices 14 has reached a predetermined number on the basis of a table in which a predetermined number has been stored in advance so that the number of the power conversion devices 14 in the standby state does not reach the predetermined number.

FIG. 5 is a diagram illustrating an example of a table 100 that is referred to in order to change the number of the power conversion devices 14 in a standby state. In the table 100, a command value for the predetermined number is not set in advance. When the table 100 is referred to, the controller 16 may not determine whether or not the number of the power conversion devices 14 that are in the standby state reaches the predetermined number.

Figure 6:
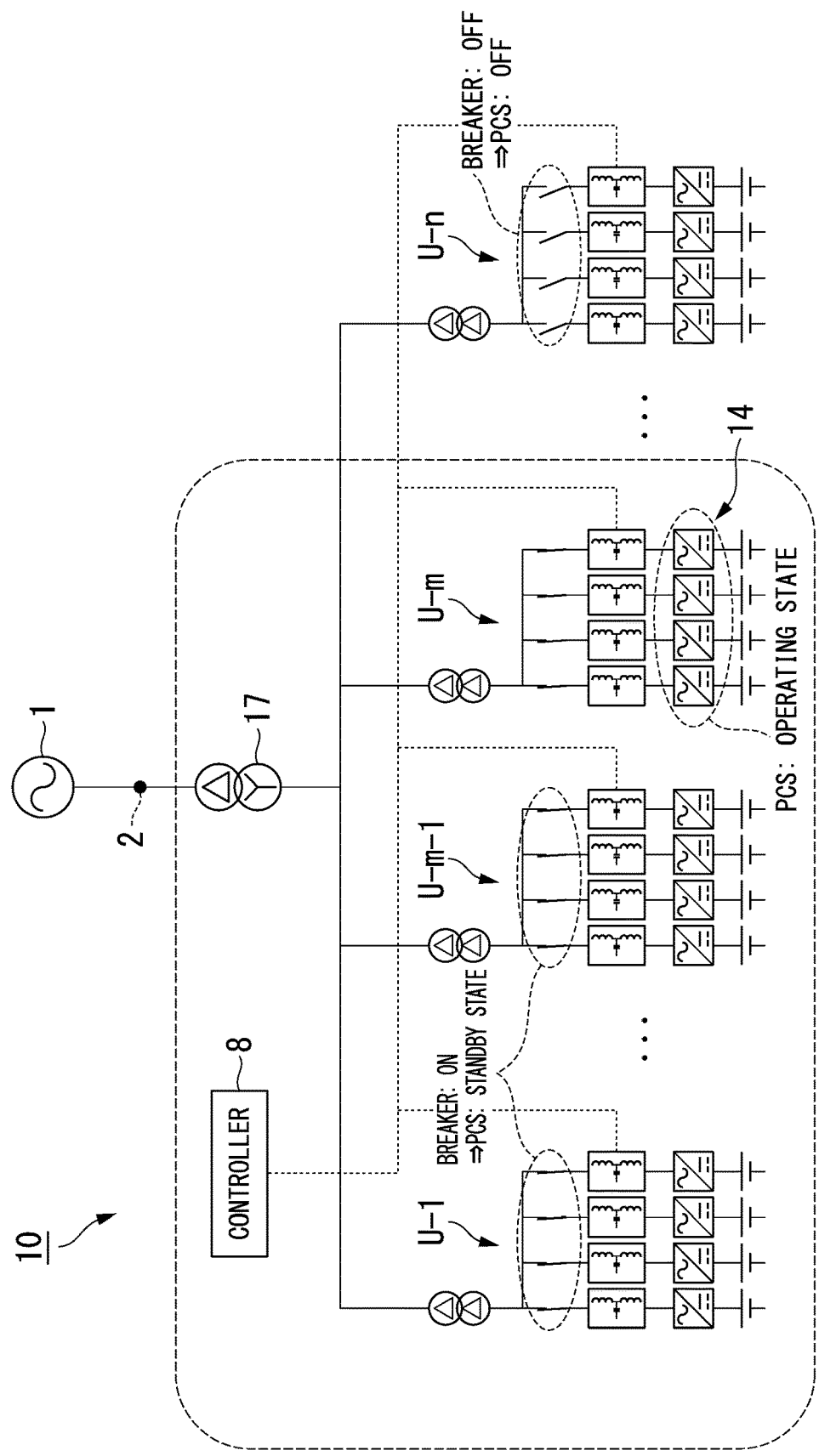
FIG. 6 is a diagram illustrating a state in which the power conversion device 14 in the standby state is in an operating state in the embodiment.

In addition to the above method, the controller 16 may control the power conversion devices 14 such that the power conversion devices 14 in the standby state into the operating state and the number of the power conversion devices 14 in the standby state is changed. FIG. 6 is a diagram illustrating a state in which the power conversion devices 14 in the standby state are changed to being in the operating state.

A value of a power that is output from the power supply system 10 may be different from a target value as a result of changing the number of the power conversion devices 14 that are in the standby state as described above. Therefore, the controller 16 performs the following adjustment.

When a power that is output by the power conversion devices 14 that have been changed to the operating state is excessive, the controller 16 may cause, for example, the plurality of power conversion devices 14 in the operating state to perform charging or discharging so that the value of the power that is output from the power supply system 10 is adjusted. For example, the controller 16 may offset an increase in power output from the power conversion devices 14 changed to being in an operating state by charging the other power conversion device 14 in an operating state with the increased power.

Regarding this offsetting of power, there are a method of adjusting an active power involving consumption of electrical energy and a method of adjusting a reactive power involving no consumption of electrical energy.

When the active power is adjusted, the controller 16 instructs the other power conversion device 14 that is in the operating state to reduce, through charging, the active power output by the power conversion device 14 that has been changed from the standby state to the operating state so that an increase in the active power is offset.

For example, the controller 16 controls the two power conversion devices 14-*m*1 and 14-*m*2 in the power supply device U-m so that a power of 100 [kW] is discharged, and controls the two remaining power conversion devices 14-*m*3 and 14-*m*4 so that a power of 100 [kW] is charged.

When the reactive power is adjusted, the controller 16 instructs the other power conversion device 14 that is in the operating state to reduce the reactive power output by the power conversion device 14 that has been changed from the standby state to the operating state so that the reactive powers are offset between the operating power conversion devices 14.

For example, the controller 16 controls the two power conversion devices 14-*m*1 and 14-*m*2 in the power supply device U-m so that an advanced reactive power of 100 [kvar] is output, and controls the two other power conversion devices 14-*m*3 and 14-*m*4 so that a delayed reactive power of 100 [kvar] is output, thereby offsetting the reactive powers.

Figure 7:
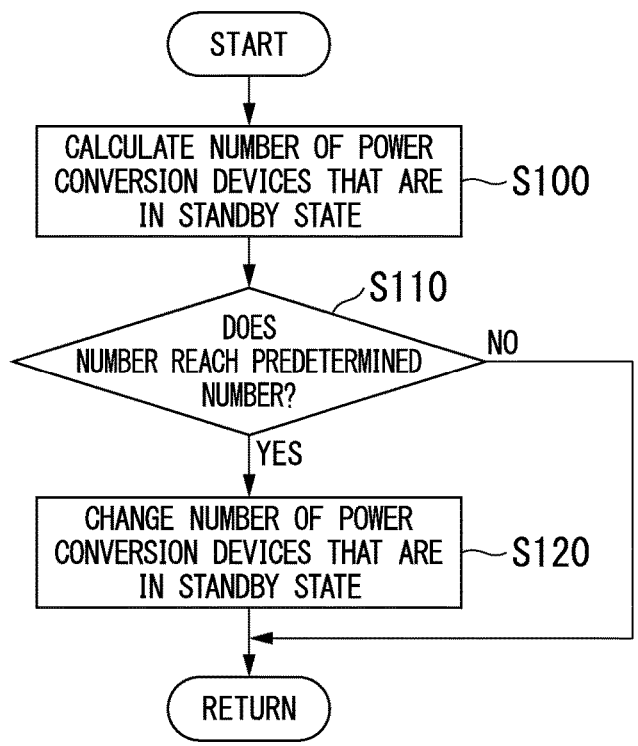
FIG. 7 is a flowchart illustrating a process that is executed in the power supply system 10 of the embodiment.

Next, a flow of the above process that is executed in the power supply system 10 will be described. FIG. 7 is a flowchart illustrating a process that is executed in the power supply system 10. The controller 16 calculates the number of the power conversion devices 14 that are in the standby state (step S100). The controller 16 determines whether or not the number of the power conversion devices 14 that are in the standby state reaches the predetermined number (step S110). When the controller 16 has determined that the number of the power conversion devices 14 that are in the standby state reaches the predetermined number, the controller 16 controls the breakers 12 so that the number of the power conversion devices 14 that are in the standby state is changed (step S120).

Figure 8:
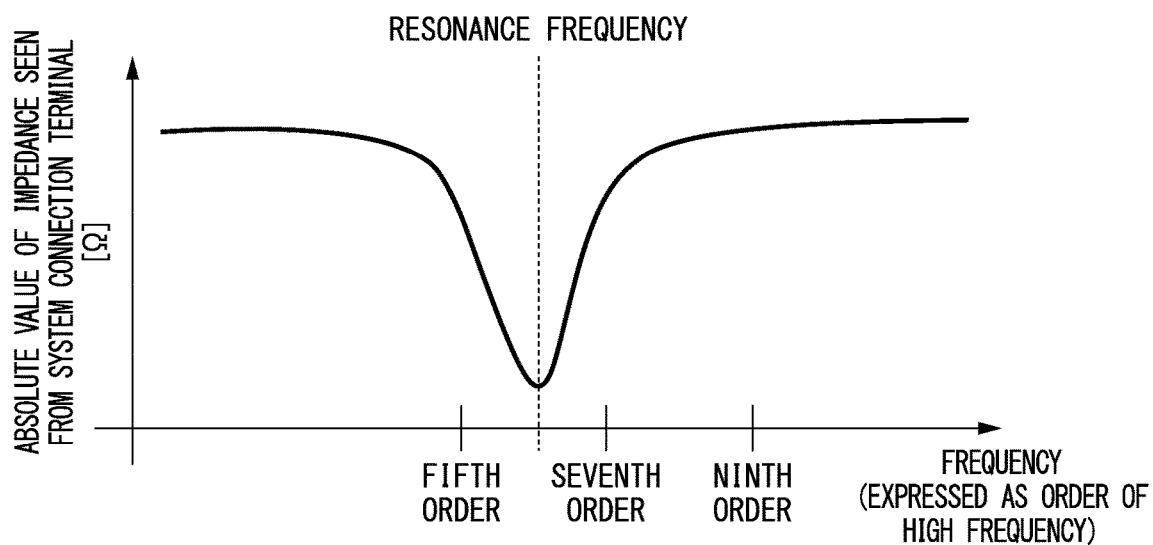
FIG. 8 is a conceptual diagram illustrating frequency-impedance characteristics (f-Z characteristics) of the power supply system 10 of the embodiment.

Next, resonance in the power supply system 10 when the above control has been performed will be described. FIG. 8 is a conceptual diagram illustrating frequency-impedance characteristics (f-Z characteristics) of the power supply system 10 with reference to the system connection terminal 2 when all of the power conversion devices 14 of the power supply system 10 enter an ON state (see FIG. 1).

Figure 9:
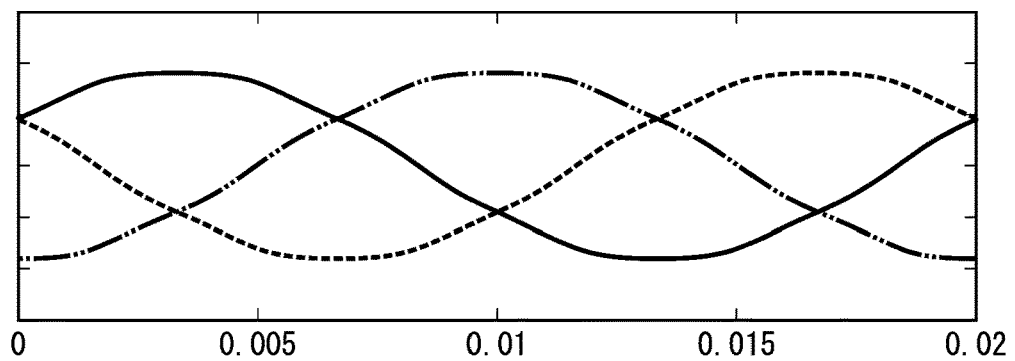
FIG. 9 is a diagram illustrating a voltage waveform at an AC terminal of the power conversion device 14 in a state in which harmonic resonance does not occur in the embodiment.

In this state, since there are no power conversion devices 14 that are in the standby state, and a resonance frequency in the f-Z characteristics is located between fifth and seventh frequencies having high harmonic content, harmonic resonance does not occur in the power supply system 10. In this case, the voltage waveform is not disturbed due to harmonic resonance at the AC terminal of the power conversion device 14. FIG. 9 is a diagram illustrating a voltage waveform at the AC terminal of the power conversion device 14 in a state in which no harmonic resonance occurs.

Next, a state in which some of the power conversion devices 14 of the power supply system 10 that are all in the ON state enter the OFF state (from the state of FIG. 1 to the state of FIG. 3) will be considered. In this case, in the power supply system 10, it is assumed that the number of the power conversion devices 14 that are in a standby state reaches the predetermined number.

Figure 10:
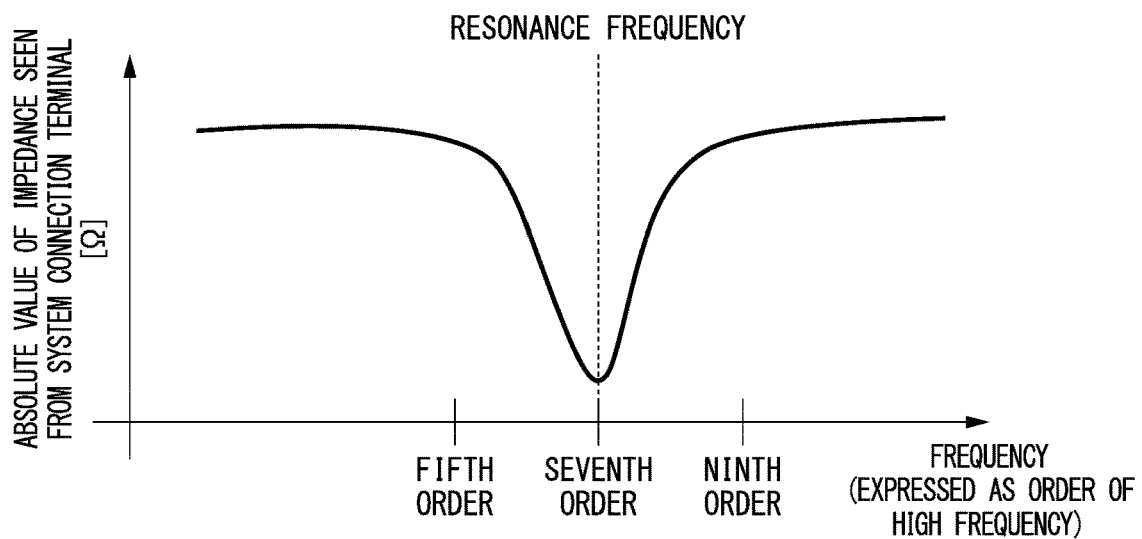
FIG. 10 is a diagram illustrating f-Z characteristics in the power supply system 10 when the number of the power conversion devices 14 in the standby state reaches a predetermined number in the embodiment.

FIG. 10 is a diagram illustrating f-Z characteristics in the power supply system 10 when the number of the power conversion devices 14 that are in the standby state reaches the predetermined number. In this state, for example, the resonance frequency is shifted to the high frequency side and matched with a frequency of a seventh order harmonic. Accordingly, harmonic resonance occurs in the power supply system 10.

Figure 11:
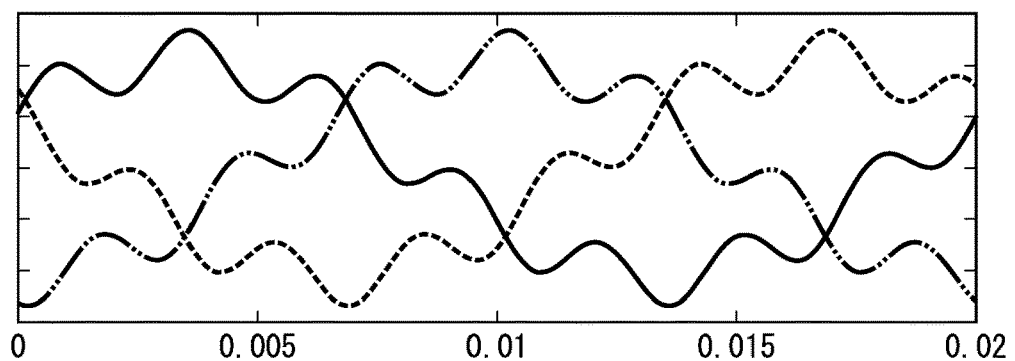
FIG. 11 is a diagram illustrating a voltage waveform at the AC terminal of the power conversion device 14 in a state in which harmonic resonance has occurred in the embodiment.

FIG. 11 is a diagram illustrating a voltage waveform at the AC terminal of the power conversion device 14 in a state in which harmonic resonance has occurred. In this case, the voltage waveform is disturbed due to harmonic resonance at the AC terminal of the power conversion device 14, and there is a risk that the power conversion device 14 will stop operating due to, for example, detection of an open phase of a three-phase voltage.

Figure 12:
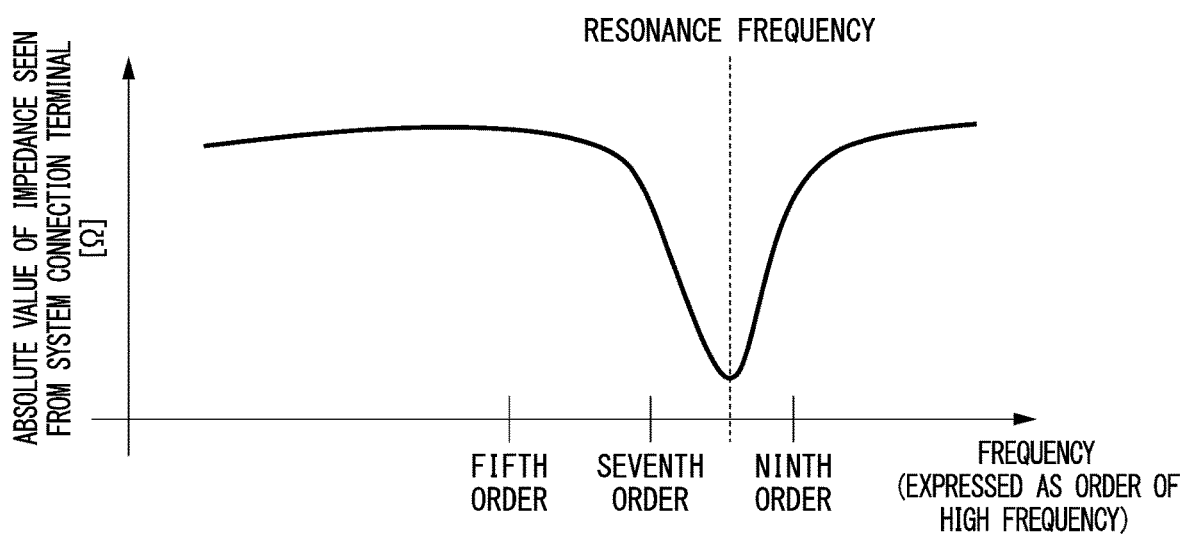
FIG. 12 is a diagram illustrating f-Z characteristics in the power supply system 10 in which the number of the power conversion devices 14 in the standby state has been changed in the embodiment.

Here, when the controller 16 controls the breakers 12 so that some of the power conversion devices 14 in the standby state are disconnected or enter the operating state and the number of the power conversion devices 14 in the standby state is changed (see FIGS. 4 and 6), the resonance frequency is further shifted to the high frequency side, thereby deviating from the seventh order harmonic. FIG. 12 is a diagram illustrating f-Z characteristics in the power supply system 10 in which the number of the power conversion devices 14 in the standby state has been changed.

Figure 13:
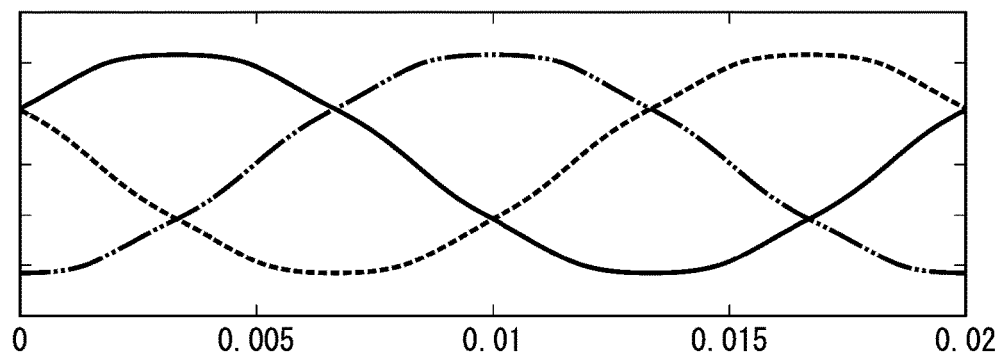
FIG. 13 is a diagram illustrating a voltage waveform at the AC terminal of the power conversion device 14 in a state in which a resonance frequency of the embodiment is shifted and harmonic resonance does not occur.

FIG. 13 is a diagram illustrating a voltage waveform at the AC terminal of the power conversion device 14 in a state in which the resonance frequency is shifted and harmonic resonance does not occur. In this case, the harmonic resonance is suppressed at the AC terminal of the power conversion device 14, the voltage waveform is not disturbed, and a smooth waveform is shown.

With the power supply system 10 described above, it is possible to suppress the harmonic resonance by controlling the breaker 12 and the power conversion device 14 without changing a main circuit configuration. In the power supply system 10, when the power conversion device 14 is controlled so that the power conversion device 14 in the standby state into the operating state and the harmonic resonance is suppressed, the number of connected power conversion devices 14 does not decrease. Accordingly, it is possible to immediately cope with a case in which a sudden increase in output is requested in the power supply system 10.

In the power supply system 10, when the plurality of power conversion devices 14 are controlled and outputs of the active power or reactive power are offset to suppress the harmonic resonance, it is possible to cause the outputs of the active or reactive power of the entire power supply system 10 to be maintained at the same value as before the operation of the power conversion device 14. Accordingly, in the power supply system 10, it is possible to suppress the harmonic resonance without affecting an output power of the system.

In particular, in the power supply system 10, when the plurality of power conversion devices 14 are controlled so that the outputs of the reactive power are offset, it is possible to apply the power supply system 10 to a system having no function of storing the active power, such as a static reactive power compensation device (STATic synchronous COMPensator: STATCOM).

Second Embodiment

The power supply system 10 of the first embodiment is configured to change the number of the power conversion devices 14 that are in the standby state on the basis of the number of the power conversion devices 14 that are in the standby state. A power supply system 10A of a second embodiment changes the number of the power conversion devices 14 in the standby state on the basis of a detection result of a harmonic voltage. In the following description, description of the same portions as those in the first embodiment will be omitted.

Figure 14:
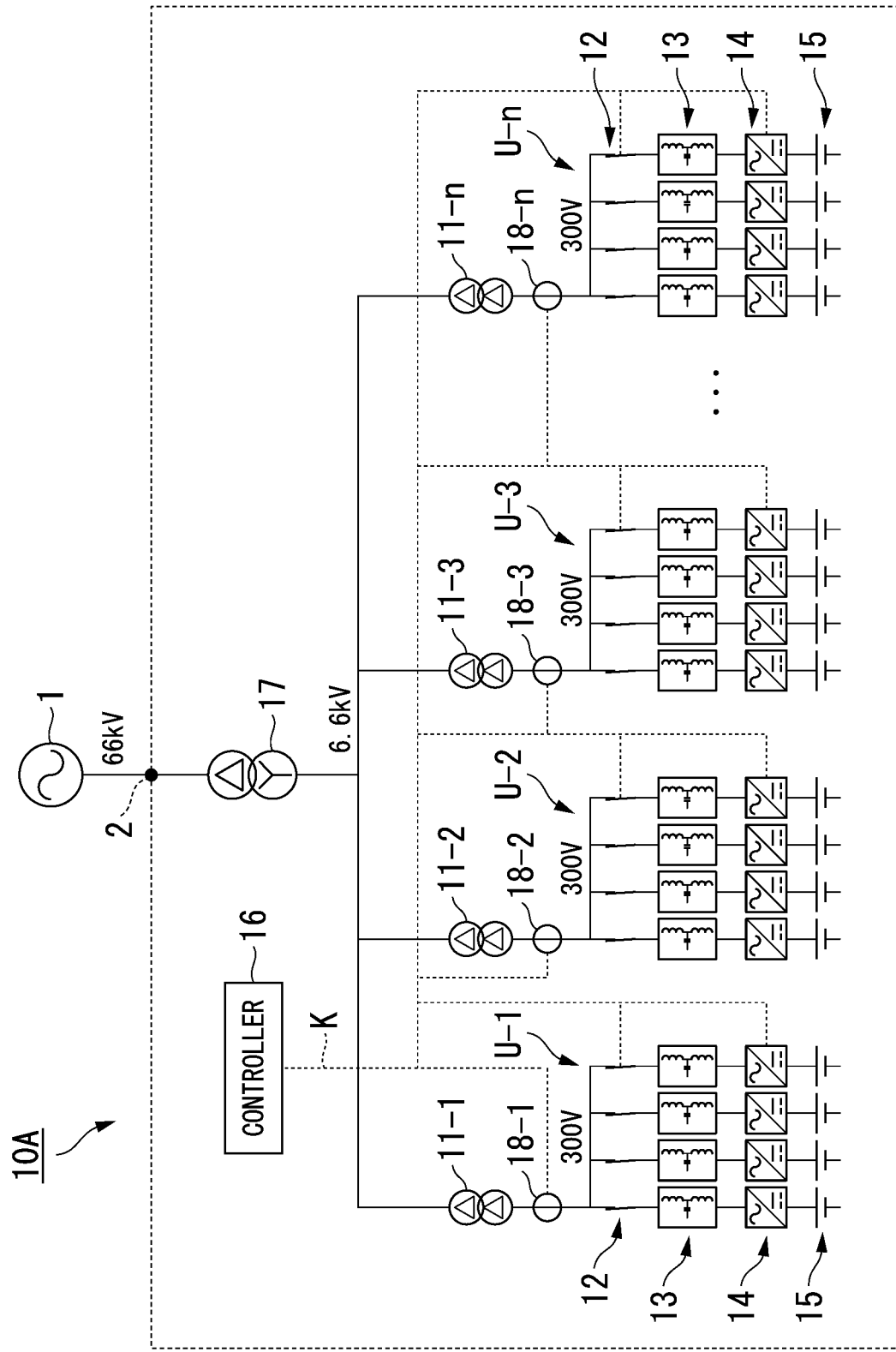
FIG. 14 is a diagram illustrating an example of a configuration of the power supply system 10A of the embodiment.

FIG. 14 is a diagram illustrating an example of a configuration of the power supply system 10A according to the second embodiment. The power supply system 10A further includes detection devices 18-1 to 18-n, in addition to the configuration of the power supply system 10 of the first embodiment. Hereinafter, when the detection devices 18-1 to 18-n are not distinguished from each other, the detection devices 18-1 to 18-n are simply referred to as a detection device 18.

The detection device 18 is connected between a boosting transformer 11 and a breaker 12 in a power supply device U. Although the detection device 18 is connected to the power conversion device 14 side of the boosting transformer 11 as illustrated, the detection device 18 may be connected to the power system 1 side of the boosting transformer 11. A detection device that detects a current of harmonic may be used instead of the detection device 18.

The detection device 18 is connected to the controller 16. The detection device 18 detects a harmonic voltage in the power supply device U. The detection device 18 detects a harmonic voltage when the breaker 12 is in an ON state.

The controller 16 controls the breakers 12 or the power conversion device 14 on the basis of a detection result of the detection device 18. The controller 16 starts control when any of the detection devices 18 detects the harmonic voltage.

In the power supply system 10A, it is assumed that some of the plurality of power conversion devices 14 are in an OFF state, and the other power conversion devices 14 are in an ON state and a standby state. Here, when the detection device 18 has detected a higher harmonic wave than a predetermined value, the controller 16 causes some of the breakers 12 connected to the power conversion device 14 that are in the standby state to enter the OFF state on the basis of a detection result of the detection device 18. Thus, the power conversion device 14 enters the OFF state, and the number of the power conversion devices 14 in the standby state is changed and decreased.

The controller 16 may cause the power conversion devices 14 that are in the OFF state to enter the ON state on the basis of the detection result of the detection device 18 so that the number of the power conversion devices 14 in the standby state is changed and is increased. Further, the controller 16 may control some of the power conversion devices 14 that are in the standby state on the basis of the detection result of the detection device 18 so that the power conversion devices 14 in the standby state into the operating state and the number of the power conversion devices 14 in the standby state is changed.

In addition, the controller 16 may control the plurality of power conversion devices 14 that are in the operating state so that outputs of the active power or reactive power are offset and an output value of the voltage in the power supply system 10 is adjusted.

Further, the detected harmonic voltage or current of harmonic may be displayed on a display unit included in a control device including the controller 16. In this case, the harmonic voltage or current of harmonic may be displayed on the display unit on the basis of an order of a fundamental frequency.

Figure 15:
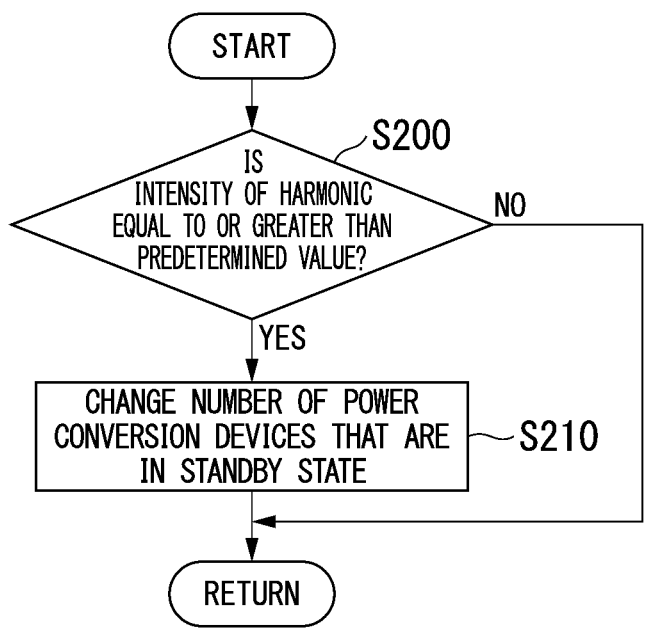
FIG. 15 is a flowchart illustrating a process that is executed in the power supply system 10A of the embodiment.

Next, a flow of the above process that is executed in the power supply system 10A will be described. FIG. 15 is a flowchart illustrating a process that is executed in the power supply system 10A. When the detection device 18 detects the harmonic voltage in the power supply device U, the controller 16 determines whether or not an intensity of the current of harmonic is equal to or greater than a predetermined value on the basis of a detection result of the detection device 18 (step S200). When the intensity of the current of harmonic is equal to or greater than the predetermined value, the controller 16 changes the number of the power conversion devices 14 that are in the standby state (step S210).

With the power supply system 10A described above, since the number of the power conversion devices 14 in the standby state is changed on the basis of a measurement result of a harmonic intensity of the voltage or current, it is possible to omit a process of calculating a range of number of power conversion devices 14 in the standby state in which harmonic resonance is likely to be occur in advance, unlike the first embodiment. Accordingly, with the power supply system 10A, it is possible to flexibly cope with a change in the configuration of the system, such as a change in the number of power supply devices U. With the power supply system 10A, since the number of the power conversion devices 14 in the standby state is changed on the basis of the measurement result of the harmonic intensity of the voltage or current, it is possible to suppress harmonic resonance even when there is an error in circuit constant in the system.

Further, with the power supply system 10A, when the number of the power conversion devices 14 in the standby state is changed by causing the power conversion devices 14 in the standby state to enter the operating state, it is possible to immediately cope with a case in which a sudden increase in output is requested in the power supply system 10A.

Third Embodiment

In a third embodiment, harmonic resonance is suppressed by using a filter circuit 20 added to configurations according to the first embodiment and the second embodiment. In the following description, description of the same portions as those in the first embodiment and the second embodiment will be omitted.

Figure 16:
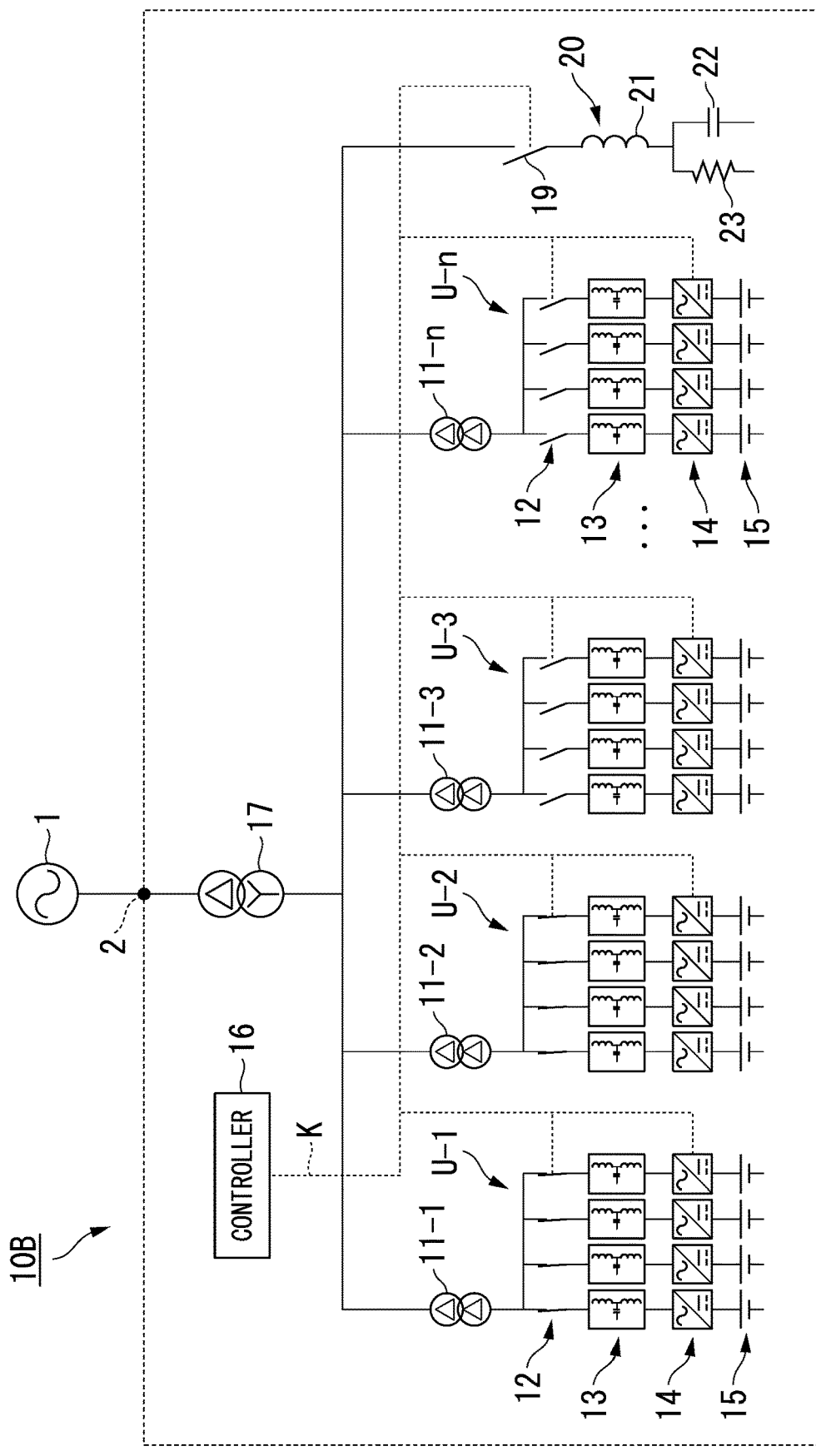
FIG. 16 is a diagram illustrating an example of a configuration of the power supply system 10B of an embodiment.

FIG. 16 is a diagram illustrating an example of a configuration of the power supply system 10B according to the third embodiment. As illustrated, the power supply system 10B includes a breaker 19 and a filter circuit 20 in addition to the configuration of the power supply system 10 according to the first embodiment. The power supply system 10B may include the breaker 19 and the filter circuit 20 in addition to the configuration of the power supply system 10A according to the second embodiment. Although a case in which one filter circuit 20 is provided in parallel to a plurality of power supply devices U is illustrated, a plurality of filter circuits 20 may be provided in parallel to the plurality of power supply devices U.

The breaker 19 is provided between the filter circuit 20 and an interconnection transformer 17. The breaker 19 is controlled by a controller 16. The controller 16 controls the breaker 19 so that the filter circuit 20 is switched between ON and OFF. The controller 16 transmits an ON signal to the breaker 19 so that the breaker 19 enters an ON state and the filter circuit 20 is connected to the power system 1 side. The controller 16 transmits an OFF signal to the breaker 19 so that the breaker 19 enters an OFF state and the filter circuit 20 is disconnected from the power system 1 side.

The filter circuit 20 includes a reactor 21, a capacitor 22, and a resistor 23. The filter circuit 20 is, for example, a low pass filter. The filter circuit 20 passes an AC current at a fundamental frequency of the power supply system 10R, but attenuates harmonic components of the AC current that are generated due to resonance. The reactor 21 is connected to the breaker 19. The resistor 23 and the capacitor 22 are connected in parallel to the reactor 21. A configuration of the filter circuit 20 is not limited thereto, and other configurations may be applied.

Figure 17:
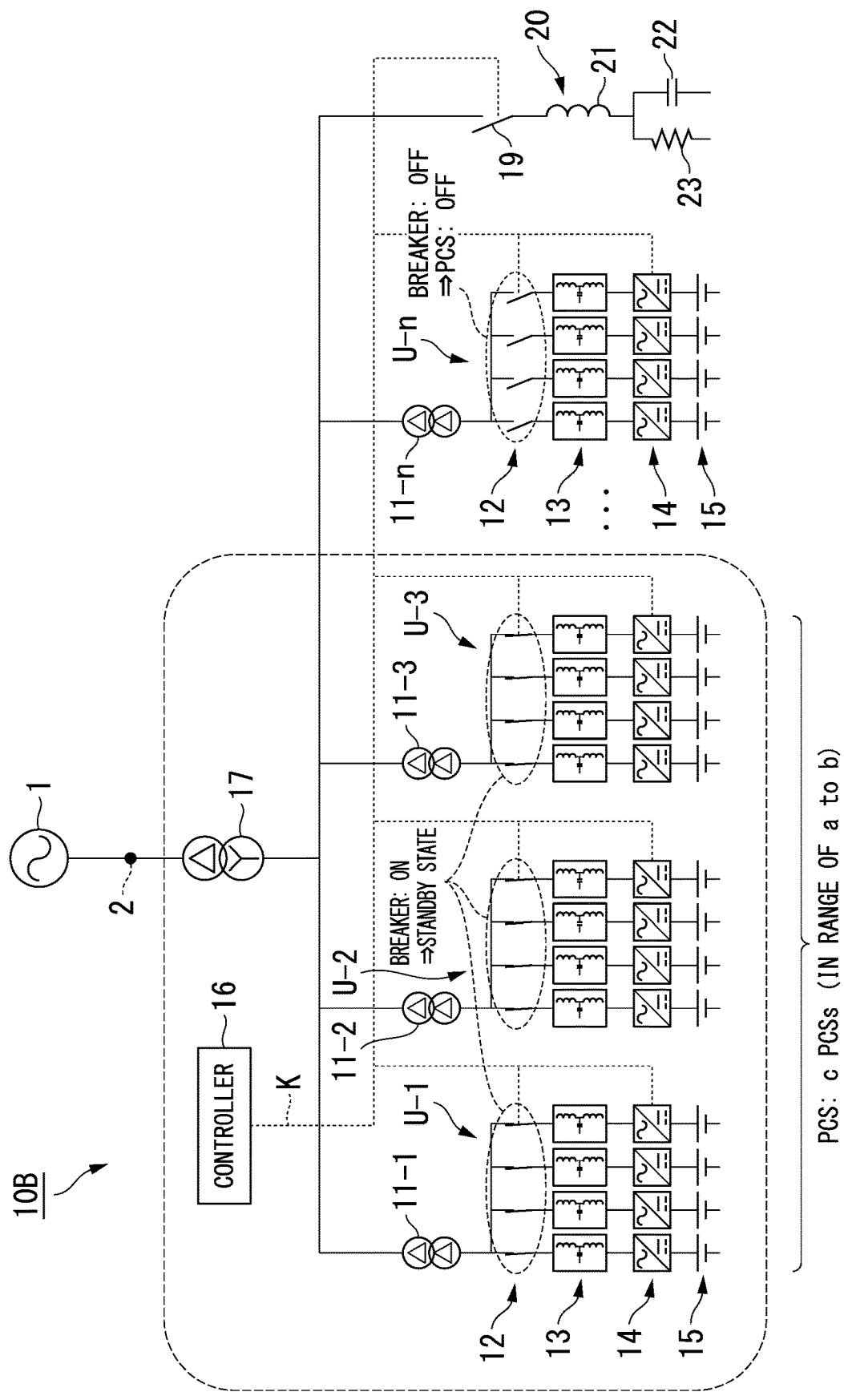
FIG. 17 is a diagram illustrating a state in which the number of the power conversion devices 14 in a standby state reaches a predetermined number in the power supply system 10B of the embodiment.

FIG. 17 is a diagram illustrating a state in which the number of the power conversion devices 14 in the standby state reaches a predetermined number in the power supply system 10B. As illustrated, it is assumed that some of the power conversion devices 14 are in an OFF state and the other power conversion devices 14 are in an ON state and a standby state. When the number of the power conversion devices 14 that are in the standby state is c (a≤c≤b), the harmonic resonance occurs in the power supply system 10B as described above.

Figure 18:
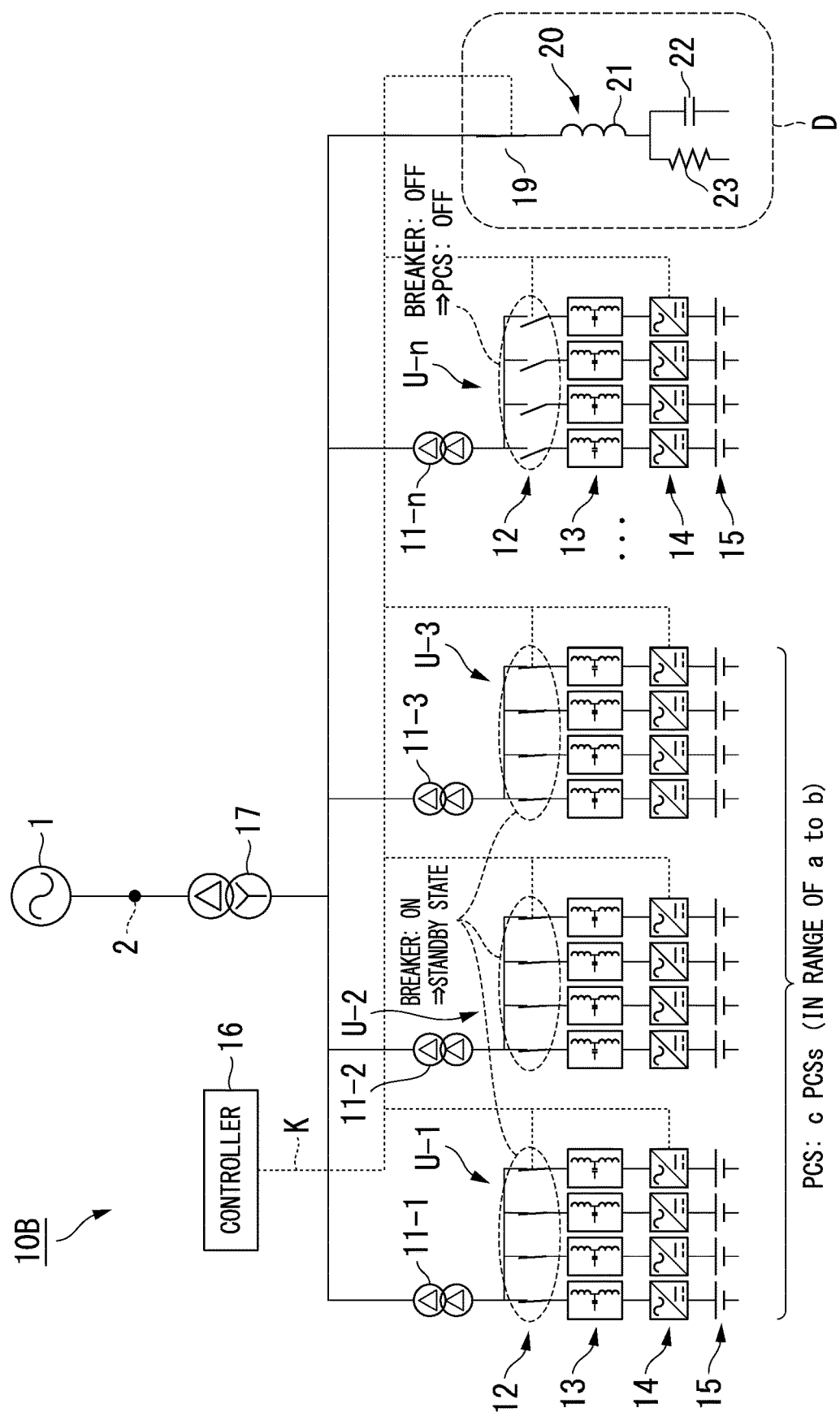
FIG. 18 is a diagram illustrating a state in which a filter circuit 20 is operated in the power supply system 10B of the embodiment.

FIG. 18 is a diagram illustrating a state in which the filter circuit 20 operates in the power supply system 10B. When the controller 16 has determined that the number of the power conversion devices 14 in the standby state reaches the predetermined number, the controller 16 controls the breaker 19 so that the filter circuit 20 enters an ON state D. Then, the filter circuit 20 attenuates harmonic resonance components generated in the AC current of the power supply system 10B. Accordingly, a resonant frequency of the power supply system 10B moves with reference to the power system 1 side.

Although, the filter circuit 20 operates on the basis of the predetermined number of power conversion devices 14 that are in the standby state calculated in advance in the third embodiment similar to the power supply system 10 of the first embodiment, the filter circuit 20 may be operated on the basis of a detection result of the harmonic voltage or current detected by the detection device 18, similar to the power supply system 10A of the second embodiment.

Figure 19:
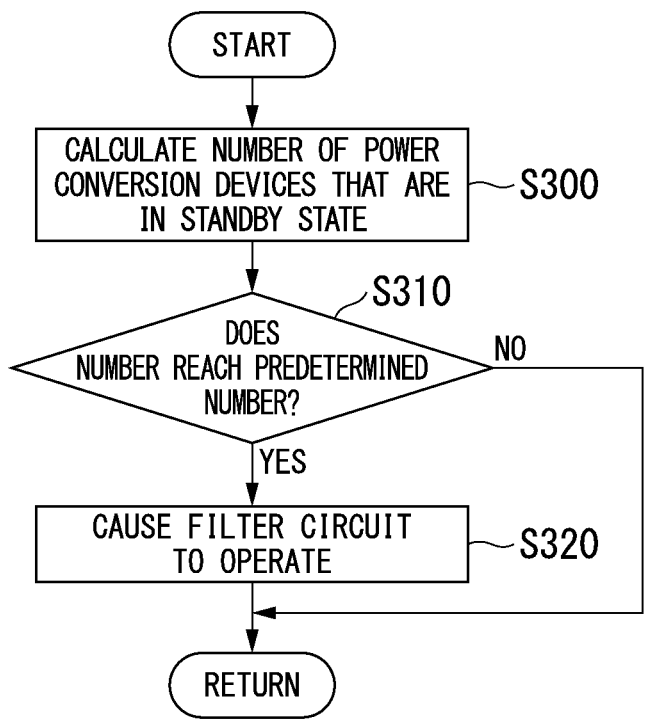
FIG. 19 is a flowchart illustrating a process that is executed in the power supply system 10 of the embodiment.

Next, a flow of the above process that is executed in the power supply system 10B will be described. FIG. 19 is a flowchart illustrating a process that is executed in the power supply system 10. The controller 16 calculates the number of the power conversion devices 14 that are in the standby state (step S300). The controller 16 determines whether or not the number of the power conversion devices 14 that are in the standby state reaches the predetermined number (step S310). When the controller 16 has determined that the number of the power conversion devices 14 that are in the standby state reaches the predetermined number, the controller 16 controls the breaker 19 so that the filter circuit 20 operates (step S320).

With the power supply system 10B described above, it is possible to move the value of the resonance frequency of the power supply system 10B and suppress the occurrence of the harmonic resonance by using the filter circuit 20 for suppressing the harmonic resonance.

With the power supply system 10B, since the filter circuit 20 operates without change in the number of the power conversion devices 14 that are in the standby state, it is possible to immediately cope with a case in which a sudden increase in output is requested.

Further, with the power supply system 10B, it is possible to reduce power loss in the power conversion device 14 or the like since the filter circuit 20 operates without the power conversion device 14 in the standby state into the operating state so that the harmonic resonance is suppressed. In addition, with the power supply system 10B, it is possible to suppress the harmonic resonance with the filter circuit 20 even when the predetermined number of the power conversion devices 14 in which the harmonic resonance occurs enter the standby state, and to omit, for example, control for skipping the predetermined number of power conversion devices 14.

According to at least an embodiment described above, the power supply system includes a plurality of power conversion devices, a plurality of breakers that are connected to the plurality of power conversion devices and perform switching of an electrical connection between the power conversion device and the power system, wherein the breaker switches the ON state and the OFF state, and a controller that controls the breakers and switch connection states of the plurality of power conversion devices are switched, and determines whether or not the connected breaker is in an ON state and electrically conducted to the power system and the number of the power conversion devices in the standby state reaches a predetermined number, thereby suppressing the occurrence of resonance due to harmonics from the power system.

Although several embodiments of the present invention have been described, these embodiments are presented as examples and are not intended to limit the scope of the invention. These embodiments can be implemented in various other forms, and various omissions, replacements, and changes can be made without departing from the gist of the invention. These embodiments or modifications thereof are included in the invention described in the claims and equivalents thereof, as included in the scope or gist of the invention.

For example, although in the power supply system, a plurality of power supply devices U are connected in parallel to one interconnection transformer 17, and four power conversion devices 14 are serially connected in parallel to one boosting transformer 11 in the power supply device U has been described in each of the above embodiments, the numbers of the interconnection transformers 17, the boosting transformers, and the power conversion devices 14 may have any relationship.

In each of the embodiments, three classes of voltage value of 66 [kV], 6.6 [kV], and 300 [V] are used, but the number of classes of the voltage value and the voltage value of each class are not limited thereto. Further, in the first embodiment and the third embodiment, a range of the number of the power conversion devices 14 that are in the standby state in which harmonic resonance occurs is set to a range of one section from a to b, but this range may include a plurality of sections.

What is claimed is:

1. A power supply system comprising:
   a plurality of power conversion devices;
   a plurality of breakers respectively connected to the plurality of power conversion devices and configured to perform switching of electrical connections between the power conversion devices and a power system, wherein the breaker switches between an ON state and an OFF state; and
   a controller configured to control the plurality of breakers and switch connection states of the plurality of power conversion devices, and the controller being configured to determine whether or not the number of the power conversion devices, which are electrically connected to the power system via the connected breaker in an ON state, and in a standby state, reaches a predetermined number,
   wherein, when the number of the power conversion devices in the standby state is the predetermined number, harmonic components flowing from the power system are amplified due to the resonance in the power conversion devices.

2. The power supply system according to claim 1, wherein the controller controls the plurality of breakers and changes the number of the power conversion devices in the standby state, if the controller determines that the number of the power conversion devices in the standby state reaches the predetermined number.

3. The power supply system according to claim 1, wherein the controller controls the plurality of power conversion devices and places the power conversion devices in the standby state into an operating state, if the controller determines that the number of the power conversion devices in the standby state reaches the predetermined number.

4. A power supply system comprising:
   a plurality of power conversion devices;
   a plurality of breakers respectively connected to the plurality of power conversion devices and configured to perform switching of an electrical connection between the power conversion device and a power system, wherein the breaker switches an ON state and an OFF state;
   a detection device configured to detect at least one of a harmonic voltage and a current of harmonic affecting the power system;
   a controller configured to control the breakers and switch connection states of the plurality of power conversion devices, and determine whether or not an intensity of the harmonic voltage or the current of harmonic detected by the detection device is equal to or greater than a predetermined value.

5. The power supply system according to claim 4, wherein when the controller determines that the intensity of the harmonic voltage or the current of harmonic detected by the detection device is equal to or greater than a predetermined value, the controller controls the breakers so that the number of the power conversion devices in the standby state is changed.

6. The power supply system according to claim 4, wherein when the intensity of the harmonic voltage or the current of harmonic detected by the detection device is equal to or greater than a predetermined value, the controller controls the breakers so that the power conversion devices in the standby state into an operating state.

7. The power supply system according to claim 6, wherein the controller instructs other power conversion devices that are in an operating state to reduce an active power output by the power conversion device that has been changed from the standby state to the operating state.

8. The power supply system according to claim 7, wherein the controller instructs the other power conversion devices that are in an operating state to reduce a reactive power output by the power conversion device that has been changed from the standby state to the operating state.

9. The power supply system according to claim 4, further comprising:
   one or a plurality of filter circuits in parallel to the plurality of power conversion devices with respect to the power system.

10. The power supply system according to claim 9, further comprising:
    a filter connection device configured to change a connection state between the power system and the filter circuit,
    wherein the controller is configured to change the connection state of the filter connection device when the number of the power conversion devices in the standby state reaches a predetermined number or when an intensity of the harmonic voltage or the current of harmonic detected by the detection device that detects at least one of the harmonic voltage d the current of harmonic is equal to or higher than a predetermined value.

11. The power supply system according to claim 4, further comprising:
    a display unit configured to display at least one of the harmonic voltage and the current of harmonic affecting the power system.

12. The power supply system according to claim 4, wherein the controller controls the breakers so that the number of plurality of power conversion devices in an operating state does not reach a predetermined number in which harmonic resonance occurring in the power system occurs when the power conversion device enters the operating state, such that the number of the power conversion devices is adjusted.

13. A power supply system comprising: a plurality of power conversion devices; and a plurality' of breakers respectively connected to the plurality' of power conversion devices and configured to perform switching of an electrical connection between the power conversion device and a power system, wherein the breaker switches an ON state and an OFF state, wherein a connection of the plurality of breakers is switched so that the number of the power conversion devices in a standby state does not reach a predetermined number, wherein, when the number of the power conversion devices in the standby state is the predetermined number, harmonic components flowing from the power system side are amplified due to the resonance in the power conversion device.

14. A control device comprising: a connection terminal connected to a plurality of breakers, the breakers being respectively connected to a plurality of power conversion devices and configured to perform switching of an electrical connections between the power conversion device and a power system, wherein the breaker switches between an ON state and an OFF state; and a controller configured to control the plurality of breakers via the connections terminal and switch connection states of the plurality of power conversion devices, and determine whether or not the number of the power conversion devices in a standby state reaches a predetermined number, wherein, when the number of the power conversion devices in the standby state is the predetermined number, harmonic components flowing from the power system side are amplified due to the resonance in the power conversion device.

* * * * *